April 29, 1952     W. A. COTTER     2,595,057

COUPLING

Filed April 2, 1948

INVENTOR
William A. Cotter
BY
J.B. Felsl...
ATTORNEY

Patented Apr. 29, 1952

2,595,057

UNITED STATES PATENT OFFICE 2,595,057

COUPLING

William A. Cotter, New York, N. Y., assignor of thirty-three and one-third per cent to Carl S. Epps and thirty-three and one-third per cent to Irving Epps, both of Brooklyn, N. Y.

Application April 2, 1948, Serial No. 18,640

8 Claims. (Cl. 287—76)

This invention relates to couplings.

An object of this invention is to provide an improved coupling or connector for connecting elongated, flexible members, such as ropes, cables, wires or the like, said coupling being adapted to be used in a manner to allow adjustment or tensioning of the connected members, while they are being connected together.

Another object of this invention is to provide a coupling device for connecting flexible, elongated members, which comprises a pair of members having opposed faces and rotatable means engaging said members for movement towards and away from each other, each of said members being formed with a pair of passages extending to the faces thereof, whereby end portions of said elongated members may be disposed in the passages, thus forming bight portions of said elongated member which are disposed on the faces of said members, the free end of said elongated member projecting outwardly of said member to permit adjustment or tensioning of the elongated members while said rotatable means is being rotated to lock the portions of said flexible members between the opposed faces of said members, as they are moved towards each other by said rotatable means.

A further object of this invention is to provide a coupling device for connecting elongated, flexible members of substantial cross sectional dimensions, which comprises a pair of members having opposed faces and rotatable means for engaging said members and adapted upon rotation to move said members towards or away from each other, each of said members being formed with a plurality of passages extending to the face thereof and being further formed with a groove on said face interconnecting the terminal ends of said passages, said groove being adapted to receive the under surface of a bight portion interconnecting other portions of an elongated member disposed in said passages while leaving an outer surface of said bight portion projecting from the face of said member, whereby, upon rotation of said rotatable means in one direction, said members are moved towards each other to lock together the bight portions of said elongated members between the faces of said members.

Still a further object of this invention is to provide a device of the character described, which comprises a pair of members having opposed faces and rotatable means for interconnecting and moving said members towards each other upon rotation in one direction, at least one of said members being formed with a plurality of parallel passages extending to the face of said member.

Yet another object of this invention is to provide a device of the character described, which comprises a pair of members having opposed faces, and rotatable means for interconnecting and moving said members towards each other, one of said members being formed with a plurality of passages extending to the face thereof, the other of said members including means for connecting said device to a base.

Still another object of this invention is to provide a device of the character described, which comprises a pair of members having opposed planar faces and rotatable means interconnecting said members and adapted upon rotation to move said members towards or away from each other, at least one of said members being formed with a plurality of passages extending to the planar surface thereof, said planar surface being formed with a groove extending between the terminal portions of said passage and said groove being formed with cross corrugations.

Another object of this invention is to provide a strong, durable, and rugged coupling device which is inexpensive to manufacture, easily manipulated, adapted to interconnect cables and ropes of various diameters, and is practical and efficient to a high degree in use.

Other objects of this invention will in part be obvious and in part hereinafter pointed out.

The invention accordingly consists in features of construction, combination of elements, and arrangement of parts which will be exemplified in the construction hereinafter described, and of which the scope of invention will be indicated in the following claims.

In the accompanying drawings, in which is shown various illustrative embodiments of this invention:

Figure 1:
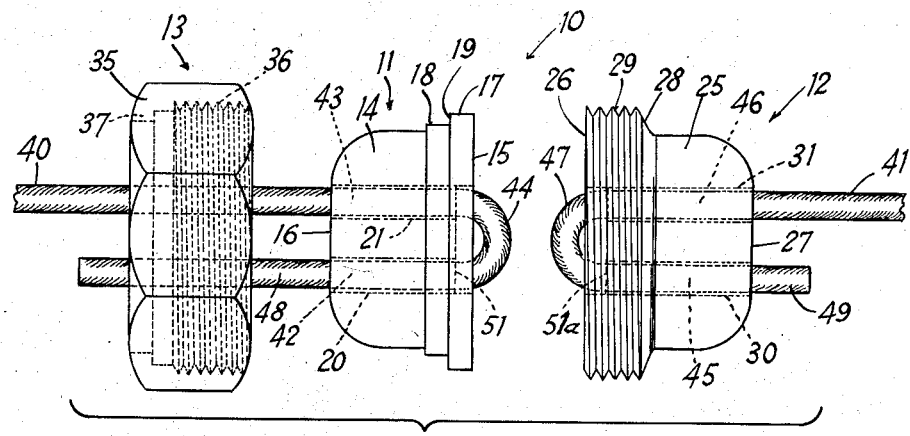
Fig. 1 is an elevational view of the parts of the device embodying the invention in disassembled relation.

Referring in detail to the drawings, 10 designates a coupling device embodying the invention.

The same comprises a pair of coaxial members 11, 12, which may be interconnected by rotatable means 13. The member 11 comprises a substantially cylindrical portion 14 having a face 15 transverse to the axis thereof, and a face 16 parallel thereto. The member 11 also comprises an annular flange 17 extending from face 15. A second annular flange 18 extends from flange 17, in stepped relation thereto, and forming an annular shoulder 19 therebetween. The member 11 is formed with a pair of through passages 20, 21, which extend from the face 15 to the face 16 and may be of circular cross section.

The member 12 also comprises a substantially cylindrical portion 25 having a face 26 transverse to the axis thereof and a face 27 parallel thereto. The member 12 also comprises an annular flange 28 extending from face 26 and having a threaded outer surface 29. The member 12 is also formed with a pair of passages 30, 31, which extend from face 26 to face 27. The passages 30, 31 may be spaced from each other a distance substantially equal to the spacing between passages 20, 21 on member 11.

Means 13 is provided for interconnecting members 11, 12 and to move one towards the other. The means 13 comprises a nut 35 having a threaded surface 36 and an annular inturned flange 37 at the outer edge thereof. The threaded surface 36 of nut 35 is adapted to engage the threaded surface 29 of member 12, while the flange 37 on the nut is adapted to engage shoulder 19 on member 11 upon rotation of the nut in the proper direction.

The coupling 10 may be used to interconnect flexible, elongated members 40, 41. An end portion 42 of elongated member 40 is disposed in passage 20 of member 11 with an adjacent portion 43 disposed in passage 21. The bight portion 44 interconnecting portions 42 and 43, will be disposed adjacent face 15 of the member 11. Similarly, an end portion 45 of elongated member 41 is disposed in passage 30 of member 12 with an adjacent portion 46 disposed in passage 31. The bight portion 47 interconnecting portions 45, 46 will be disposed adjacent face 26 of member 12. On rotating the nut 35 to move member 11 towards member 12, the bight portions 44 and 47 will be squeezed together between the opposed faces 15, 26 of the member 11, 12, respectively, thus locking the coupled elongated members 40, 41 together. If necessary or desirable, the free ends 48, 49 of elongated members 40, 41 which project outwardly of faces 16, 27, respectively, of members 11, 12, respectively, may be grasped and pulled previous to, or during the rotation of nut 35, to adjust the tension on the the coupled elongated members 40, 41. When properly tensioned the elongated members are finally locked together by completing the rotation of nut 35.

Figures 2, 3:
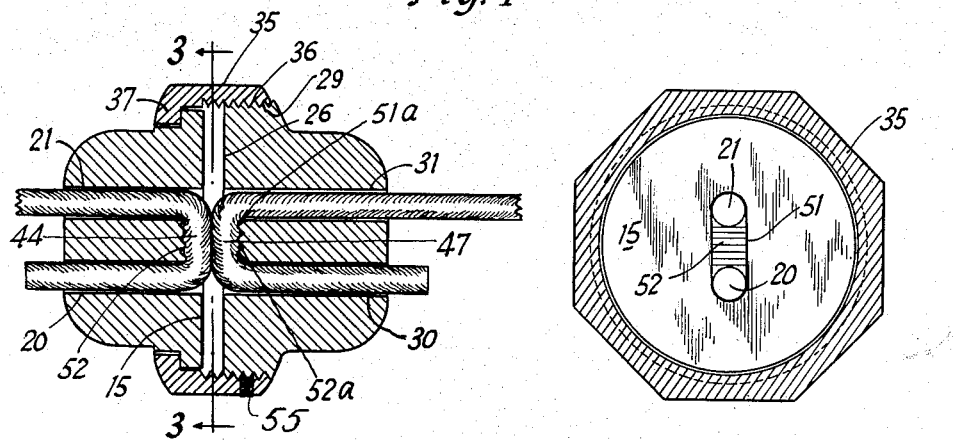
Fig. 2 is a sectional view of the parts of the device shown in Fig. 1 in connected relation.
Fig. 3 is a sectional view taken on the line 3—3 of Fig. 2.

Provision is made for using the coupling 10 with elongated members 40, 41 which are of substantial diameter and therefore would have bight portions which would project unduly from the surfaces 15, 26 of the members 11, 12. To this end the member 11 is formed on its surface 15 with a groove 51 which interconnects the terminal portions of passages 20, 21. The groove 51 is formed with transverse corrugations or teeth 52. The member 12 is similarly formed on its surface 26 with a groove 51a and cross corrugations 52a. The bight portions 44, 47 of the members 40, 41 may thus be disposed in the grooves 51, 51a. The depth of grooves 51, 51a is such as to accommodate approximately the inner half of the bight portion of the elongated member disposed within the grooves, thus leaving the outer half of the bight portions to project outwardly of faces 15, 26, as shown in Fig. 2. The cross corrugations or teeth 52, 52a form additional gripping means for the bight portions of the elongated members and are adapted to prevent slippage. The members 11, 12 are moved towards each other by rotating the nut 35 in the proper direction, thus locking the bight portions of the interconnected elongated members, in the manner previously described.

The nut 35 may be easily turned by means of a wrench and may be provided with a set screw 55 to lock the nut in the final position against rotation.

Figures 4, 5:
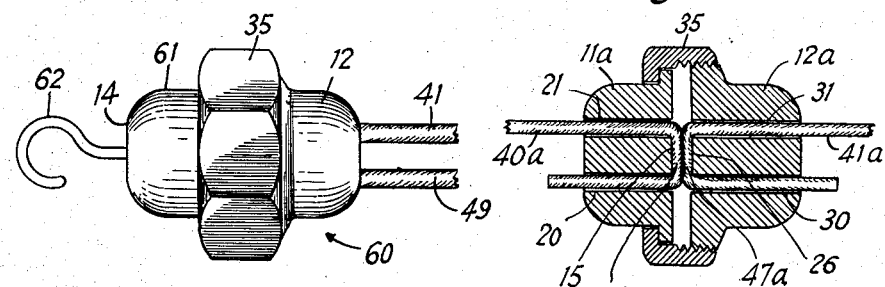
Fig. 4 is a side elevational view of the device embodying the invention and forming a further modification thereof.
Fig. 5 is a sectional view of a device embodying the invention and forming a modification thereof.

In Fig. 4 is shown a further modification of the device embodying the invention. In this form, the device 60 comprises member 12 which has coupled thereto by means of nut 35, a member 61. Member 61 is entirely similar to member 11 except that the passages 20, 21 are omitted therefrom. The member 61 is provided with a hook 62 extending outwardly of face 14. The device 60 may thus be supported or suspended from any suitable base by means of hook 62 while elongated member 41 may be adjustably positioned or tensioned relative to device and locked in position in the manner previously disclosed.

In Fig. 5 is shown a coupling device 70 embodying the invention and illustrating a further modification thereof. The device 70 comprises members 11a and 12a which are identical with members 11 and 12, respectively, except that the grooves 51, 51a and corrugations 52, 52a have been omitted. The device 70 may be used to interconnect or couple elongated members 40a, 41a of smaller diameter wherein the bight portions 44a, 47a thereof are disposed on the surfaces 15, 26 of the members 11, 12, and are locked directly therebetween upon rotating the nut 35 in the proper direction, as previously described. If desired, the surfaces 15, 26 of the members 11, 12 may be provided with slight cross indentations or corrugations between the terminal portions of the passages 20, 21; 30, 31, to provide additional gripping means for the bight portions 44a, 47a of the interconnected members 40a, 41a.

Upon rotating the nut 35 in one direction, the members 11, 12; 11a, 12a; or 61, 12 may be moved towards each other to effect the locking of elongated members being coupled as described above. When it is desired to unlock the elongated member, it is only necessary to rotate the nut 35 in the opposite direction to move the members away from each. This is particularly advantageous when it is necessary to take up slack in the coupled elongated members, since, on unlocking the coupling, the free ends thereof may be pulled until the proper tension in the members is established and then relocking the coupling by rotating the nut 35 in the proper direction.

It is apparent that the devices embodying the invention may be used to couple or interconnect various elongated members such as cables, wires, ropes, or the like. The coupling may also be used to electrically interconnect insulated wire cables which would only require that the insulation be removed at the bight portions to insure electrical contact between the coupled members.

It is understood that the passages in the respective coupled members 11, 12; 11a, 12a, do not have to be in alignment as long as the interconnected elongated members may be compressed between the opposed faces of the members and locked therebetween.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawings, is to be interpreted as illustrative and not in a limiting sense.

Having thus described my invention, I claim as new and desire to secure by Letters Patent:

1. A coupling device comprising a pair of members having opposed surfaces and rotatable means engaging said members to move the surfaces thereof towards each other upon rotation of said rotatable means in one direction, each of said members being formed with a pair of passages extending to the surface thereof, said surface of each of said members being formed with a groove extending from the terminal portion of one passage to the terminal portion of the other passage in said member.

2. A coupling device comprising a pair of members having opposed surfaces and rotatable means engaging said members to move the surfaces thereof towards each other upon rotation of said rotatable means in one direction, each of said members being formed with a pair of passages extending to the surface thereof, said surface of each of said members being formed with a groove extending from the terminal portion of one passage to the terminal portion of the other passage in said member, said grooves being formed with transverse corrugations.

3. A coupling device comprising a pair of members having opposed surfaces and rotatable means engaging said members to move the surfaces thereof towards each other upon rotation of said rotatable means in one direction, each of said members being formed with a pair of passages extending to the surface thereof, the opposed surfaces of said member having the portions thereof between the terminal portions of said passages formed with indentations.

4. In combination, a pair of elongated flexible members and means for interconnecting said elongated members including a pair of coaxial members having opposed faces and rotatable means interconnecting said coaxial members and adapted upon rotation in one direction to move one of said coaxial members towards the other of said coaxial members, each of said coaxial members being formed with a pair of passages extending to the face of said coaxial member, portions of each of said elongated members being disposed in the passages of each of said coaxial members and bight portions interconnecting the portions disposed in said passages being disposed between the opposed faces of said coaxial members, whereby rotation of said rotatable means in said direction will cause the said bight portions of the elongated members to be locked relative to each other between the opposed faces of said coaxial members.

5. In combination, a pair of elongated flexible members and means for interconnecting said elongated members including a pair of coaxial members having opposed faces and rotatable means interconnecting said coaxial members and adapted upon rotation in one direction, to move one of said coaxial members towards the other of said coaxial members, each of said coaxial members being formed with a pair of passages extending to the face of said coaxial member, portions of each of said elongated members being disposed in the passages of each of said coaxial members and bight portions interconnecting the portions disposed in said passages being disposed between the opposed faces of said coaxial members, whereby rotation of said rotatable means in said direction will cause the said bight portions of the elongated members to be locked relative to each other between the opposed faces of said coaxial members, free ends of said elongated members projecting outwardly of said coaxial members and being adapted to be pulled to tension the interconnected elongated members previous to the locking of the bight portions of said elongated members relative to each other.

6. In combination, a pair of elongated flexible members and means for interconnecting said elongated members including a pair of coaxial members having opposed faces and rotatable means interconnecting said coaxial members and adapted upon rotation in one direction to move one of said coaxial members towards the other of said coaxial members, each of said coaxial members being formed with a pair of passages extending to the face of said coaxial member, portions of each of said elongated members being disposed in the passages of each of said coaxial members and bight portions interconnecting the portions disposed in said passages being disposed between the opposed faces of said coaxial members, whereby rotation of said rotatable means in said direction will cause the said bight portions of the elongated members to be locked relative to each other between the opposed faces of said coaxial members, each of said coaxial members being formed with a groove on the face thereof between the terminal portions of said passages to accommodate the inner portion of the bight portions of said elongated members.

7. In combination, a pair of elongated flexible members and means for interconnecting said elongated members including a pair of coaxial members having opposed faces and rotatable means interconnecting said coaxial members and adapted upon rotation in one direction to move one of said coaxial members towards the other of said coaxial members, each of said coaxial members being formed with a pair of passages extending to the face of said coaxial member, portions of each of said elongated members being disposed in the passages of each of said coaxial members and bight portions interconnecting the portions disposed in said passages being disposed between the opposed faces of said coaxial members, whereby rotation of said rotatable means in said direction will cause the said bight portions of the elongated members to be locked relative to each other between the opposed faces of said coaxial members, each of said coaxial members being formed with a groove on the face thereof between the terminal portions of said passages to accommodate the inner portion of the bight portions of said elongated members, said grooves being formed with a plurality of indentations.

8. In combination, a pair of elongated flexible members and means for interconnecting said elongated members including a pair of coaxial members having opposed faces and rotatable means interconnecting said coaxial members and adapted upon rotation in one direction to move one of said coaxial members towards the other of said coaxial members, each of said coaxial members being formed with a pair of passages extending to the face of said coaxial member, portions of each of said elongated members being disposed in the passages of each of said coaxial members and bight portions interconnecting the portions disposed in said passages being disposed between the opposed faces of said coaxial members, whereby rotation of said rotatable means in said direction will cause the said bight portions of the elongated members to be locked relative to each other between the opposed faces of said coaxial members, the opposed faces of each of said coaxial members having the portions thereof between the terminal portions of said passages formed with a plurality of indentions.

WILLIAM A. COTTER.

REFERENCES CITED

The following references are of record in the file of this patent:

UNITED STATES PATENTS

| Number | Name | Date |
|---|---|---|
| 100,976 | Chamberlain | Mar. 22, 1870 |
| 220,936 | McTighe | Oct. 28, 1879 |
| 551,166 | Kelsch | Dec. 10, 1895 |
| 2,007,357 | Anderson et al. | July 9, 1935 |
| 2,416,943 | Nicolazzo | Mar. 4, 1947 |
| 2,498,410 | Gavallet | Feb. 21, 1950 |

FOREIGN PATENTS

| Number | Country | Date |
|---|---|---|
| 388,805 | Germany | of 1924 |